No. 861,181. PATENTED JULY 23, 1907.
H. T. HUGHES.
DISH DRAINER.
APPLICATION FILED APR. 10, 1907.
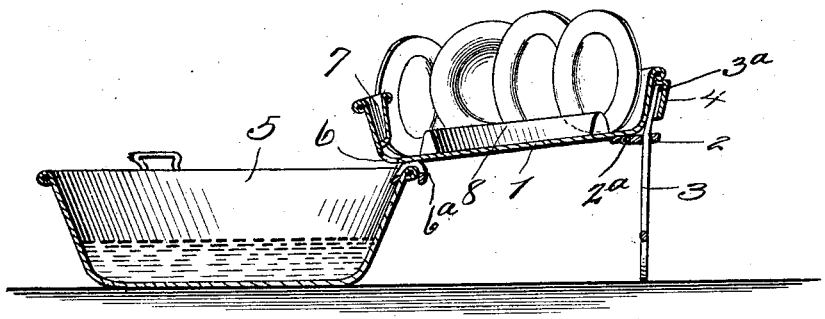
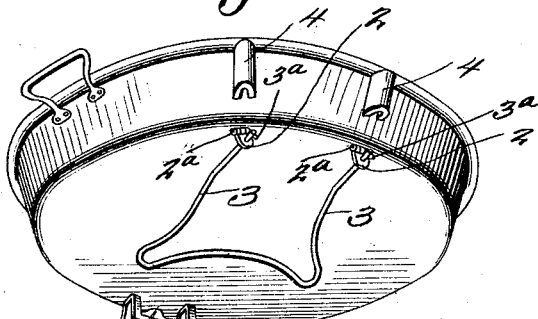
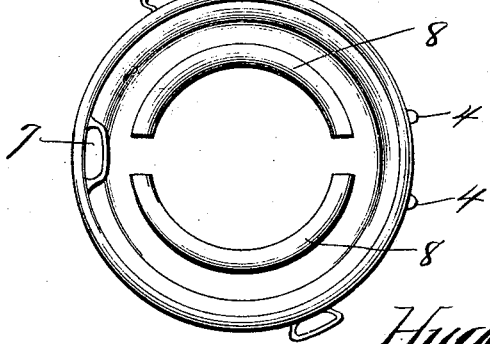
Witnesses
Inventor
Hugh T. Hughes
By Dean Swift
Attorney

UNITED STATES PATENT OFFICE.

HUGH T. HUGHES, OF FRANKFORT, NEW YORK, ASSIGNOR OF ONE-HALF TO H. D. SCAMMEL.

DISH-DRAINER.

No. 861,181.  Specification of Letters Patent.  Patented July 23, 1907.

Application filed April 10, 1907. Serial No. 367,406.

*To all whom it may concern:*

Be it known that I, HUGH T. HUGHES, a citizen of the United States, residing at Frankfort, in the county of Herkimer and State of New York, have invented certain new and useful Improvements in Draining-Pans, of which the following is a specification, reference being had therein to the accompanying drawing.

The invention relates to dish-draining pans.

The principal object of this invention is to provide a device of this character which will result in the saving of a great amount of labor and which can be manufactured and placed on the market at an inexpensive price.

With these and other objects in view, the invention consists in the novel construction and arrangement of parts hereinafter described and shown and particularly pointed out in the appended claims.

In the drawings, Figure 1 is a sectional view of the invention shown ready for use. Fig. 2, is a perspective view, of the drain pan, looking upwardly thereon. Fig. 3 is a top plan view of the drain pan.

Referring to the drawings, 1 designates a pan having perforated ears 2, which are hinged as at 2ª to the bottom of the pan 1; these ears are adapted to receive the ends of U-shaped legs 3. The U-shaped legs 3 which pass through the ears 2 are adapted to engage sockets 4. The U-shaped legs are provided with knobs 3ª, to prevent removal from the perforated ears 2, as clearly shown in Figs. 1 and 2. When the pan is in operative position, the afore-mentioned legs are inserted in their place and hold the pan in a tilting position, while the other side of the pan rests upon a receiving pan 5. The legs are designed to be removed from the sockets 4, so as to allow them to be folded underneath the said drain pan, as clearly shown in Fig. 2. The pan 1 is provided with an opening 6 which enables the water to pass therefrom into the receiving pan as the crockery therein is drained. Adjacent the opening 6, is a U-shaped member 6ª, which is adapted to engage the edge of the pan 5, so as to prevent displacement of the said draining pan, as clearly shown in Fig. 1.

The pan 1 is provided with a pocket 7, which is mounted on one side thereof and is designed to hold soap in a convenient manner. The interior of the pan 1 is also provided with circular supports 8, which are adapted to hold dishes and other kinds of crockery in a vertical position.

It will be seen that the invention as herein described is simple, inexpensive and durable and is adapted to save time and trouble.

It will also be seen that the invention is adapted to be readily applied to any shape or size pan.

What is claimed is:

1. In a device as set forth, a drain pan, a receiving pan, said drain pan having a U-shaped member to engage the upper edge of the receiving pan, said drain pan having hinged perforated ears, a U-shaped support engaging said perforated ears, said drain pan having upon its outer circumference sockets designed to receive the upper extremities of the U-shaped support, said upper extremities having knobs to prevent removal of said U-shaped support from the said perforated ears.

2. In a device as set forth, a drain pan, a pan to receive the drainage therefrom, said drain pan having an opening therein, and a U-shaped member to engage said receiving pan, said drain pan having a pocket and circular ribs for the purpose specified, said drain pan having perforated ears, a U-shaped support to be received thereby, said drain pan having pockets to receive said U-shaped support when disposed vertically, said hinged perforated ears being of such character as to allow the U-shaped support to be folded against the bottom of the drain pan when the said U-shaped support is removed from engagement with said pockets, substantially as and for the purpose specified.

3. In a device as set forth, a drain pan, a pan to receive the drainage therefrom, said drain pan having an opening and hinged perforated ears, a U-shaped support engaging the perforations of said ears, said drain pan having upon its outer circumference, sockets, designed to receive the upper extremities of the U-shaped support, said upper extremities having knobs to prevent removal of said U-shaped support from said perforated ears.

In testimony whereof I hereunto affix my signature in presence of two witnesses.

HUGH T. HUGHES.

Witnesses:
MARGARET SCRIBER,
WALTER C. RIX.